N. Stephens,
Tapping Pipes.
No. 67,080.　　　　　　Patented July 23, 1867.
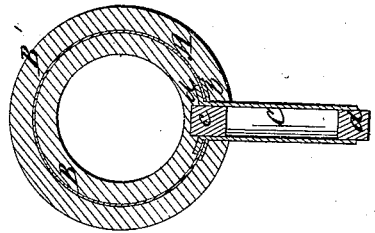
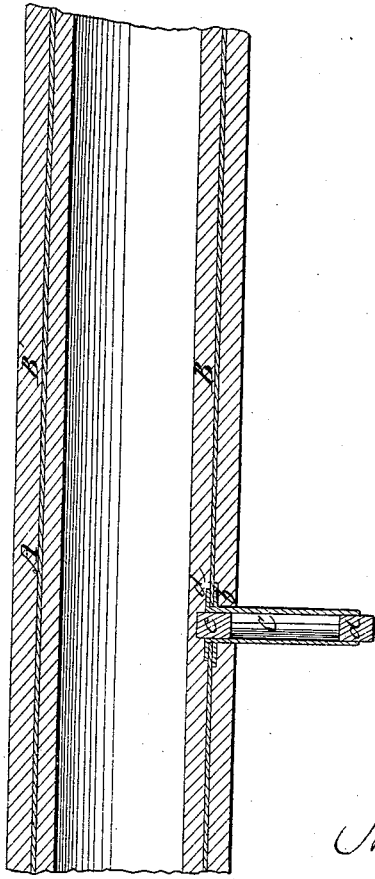
Witnesses.
J. M. Coombs
Geo. Reed
Inventor
Nathan Stephen

United States Patent Office.

NATHAN STEPHENS, OF BROOKLYN, NEW YORK.

Letters Patent No. 67,080, dated July 23, 1867.

IMPROVED TAP FOR CEMENT-LINED PIPES.

The Schedule referred to in these Letters Patent and making part of the same.

TO ALL WHOM IT MAY CONCERN:

Be it known that I, NATHAN STEPHENS, of Brooklyn, in the county of Kings, and State of New York, have invented a new and useful Improvement in Tapping Wrought-Iron or other Pipes Lined or Coated with Cement, of which the following is a full, clear, and exact description, reference being had to the accompanying drawing forming part of this specification, and in which—

Figures 1 and 2 represent sections at right angles to each other of a pipe in part with my improvement applied thereto.

Similar letters of reference indicate corresponding parts.

This my improvement, which is applicable to water, gas, and other pipes, relates to that description of such pipes in which wrought-iron or thin sheet-metal pipes are used, and the same protected by an inside lining and outside coating of hydraulic or other suitable cement. To tap pipes of this description, with or without the full head or pressure on, and to connect a branch or service pipe thereto, has previously been the subject of special invention, Letters Patent of the United States having issued to Jonathan Ball on the 11th day of July, 1854, for an improvement in this connection; but my invention importantly differs therefrom in fitting to and through the wrought-iron pipe, before or after it is cemented, a lead or other incorrodible fusible metal branch, with a head or flange on the inside, which may be corked or plugged, as may also (to exclude dirt) the outer end of said branch; which latter preferably has a flange or fast-washer lying against the exterior of the metal pipe. In this way the branch is a fixture to or in and through the wrought iron of the pipe, and after the cement is applied a projection into the lining and through the outer coating, ready for attachment of an ordinary faucet, and whereby several advantages, as hereinafter specified, are obtained.

Referring to the accompanying drawing, A represents the sheet-iron body of which the pipe is composed, and B B' the cement lining and coating thereto. Prior to applying the cement, however, the pipe has fitted, through a suitable hole formed in it, a branch or tube, C, made of lead or other incorrodible and fusible metal or alloy. This branch is flattened down at its inner end to form a head, $a$, and may have soldered to it on the outside of the pipe A a washer or flange, $b$, or other provision made to prevent the branch being driven or pressed inwards. In the inner end of said branch is fitted a cork or other suitable and removable plug or stopper, $c$, and also preferably another, $d$, furnished the outer end thereof. The cement or lining B is applied to the interior of the pipe so as to cover the head $a$ of the branch C, and preferably for a limited thickness the cork or stopper $c$, and the outside cement or coating applied either prior or subsequently to the outer cork or stopper $d$ (if used) being inserted. By this my improvement an ordinary faucet may be attached or soldered direct to the branch C, and latter bent to any suitable angle, if desired, for attachment of the service pipe without breaking away the outer covering of cement, or baring the metal pipe and tinning it for attachment of the faucet as has heretofore been done, or without drilling the metal pipe after it is laid and cemented, for establishing communication therethrough, and without exposure to corrosion of the edges of said aperture or communication, which are protected by the lead or other like branch C fitting through the same, it only being necessary, on soldering the faucet to the branch C, to draw out the stopper $d$, which is used mainly to exclude dirt, and opening the faucet to insert a cork-screw to draw out the cork or stopper $c$, and afterwards a rammer or other tool to puncture the portion of inside cement covering it, supposing the lining to be of sufficient thickness to cover the cork, or instead of drawing out the cork $c$, it may, with any cement covering it, be forced inwards without material damage to the lining. After this the service pipe may be attached.

It will be apparent that the branch C may be secured to the pipe A by solder applied direct to it without the intervention of the flange $a$ and washer $b$.

What I claim, and desire to secure by Letters Patent, is—

The lead or other like soft-metal branch C, with its stopper or stoppers fitted to project through the sheet-iron pipe A, and arranged in relation thereto, and its cement lining and covering, B B', for use in concert or combination therewith, substantially as specified.

NATHAN STEPHENS.

Witnesses:
   J. W. COOMBS,
   G. W. REED.